(12) United States Patent
Fielder et al.

(10) Patent No.: US 7,761,072 B2
(45) Date of Patent: Jul. 20, 2010

(54) GPS RECEIVER WITH IMPROVED IMMUNITY TO BURST TRANSMISSIONS

(75) Inventors: Dennis Arthur Fielder, Royston (GB); Anne Fielder, legal representative, Royston (GB); Stefan Fulga, Ottawa (CA)

(73) Assignee: Sige Semiconductor (Europe) Limited, Hertfordshire (GB)

( * ) Notice: Subject to any disclaimer, the term of this patent is extended or adjusted under 35 U.S.C. 154(b) by 660 days.

(21) Appl. No.: 11/302,371

(22) Filed: Dec. 14, 2005
(Under 37 CFR 1.47)

(65) Prior Publication Data

US 2010/0150284 A1 Jun. 17, 2010

(51) Int. Cl.
*H04B 1/06* (2006.01)
*H04B 7/00* (2006.01)

(52) U.S. Cl. .............. 455/233.1; 455/296; 455/556.1; 375/346; 375/350

(58) Field of Classification Search ............... 455/230, 455/233.1, 296, 310, 311, 556.1, 557; 375/346, 375/347, 348, 349, 350, 351
See application file for complete search history.

(56) References Cited

U.S. PATENT DOCUMENTS

| 4,649,538 | A | 3/1987 | DeLuca et al. |
| 4,743,863 | A | 5/1988 | Cassany et al. |
| 4,761,829 | A | 8/1988 | Lynk et al. |
| 5,355,524 | A | 10/1994 | Higgins, Jr. |
| 5,420,592 | A | 5/1995 | Johnson |
| 5,434,787 | A | 7/1995 | Okamoto et al. |
| 5,451,948 | A | 9/1995 | Jekel |
| 5,722,063 | A | 2/1998 | Peterzell et al. |
| 5,732,341 | A | 3/1998 | Wheatley, III |
| 5,768,319 | A | 6/1998 | Durboraw, III |
| 5,808,582 | A | 9/1998 | Woo |
| 5,953,640 | A | 9/1999 | Meador et al. |
| 6,104,978 | A | 8/2000 | Harrison et al. |
| 6,125,135 | A | 9/2000 | Woo et al. |
| 6,182,011 | B1 | 1/2001 | Ward |
| 6,215,812 | B1 | 4/2001 | Young et al. |
| 6,400,934 | B1 | 6/2002 | Calixte |
| 6,498,819 | B1 | 12/2002 | Martin |
| 6,567,649 | B2 | 5/2003 | Souissi |
| 6,681,181 | B2 * | 1/2004 | Fielder ................. 701/213 |
| 6,741,844 | B2 | 5/2004 | Medvid et al. |
| 6,947,840 | B2 * | 9/2005 | Fielder ................. 701/214 |
| 6,999,427 | B1 * | 2/2006 | Usuda et al. ........... 370/318 |

(Continued)

FOREIGN PATENT DOCUMENTS

EP 0777337 6/1997

(Continued)

*Primary Examiner*—Edward Urban
*Assistant Examiner*—Christian A Hannon (57) ABSTRACT

GPS signals are typically weak and thus easily interfered with by other radio transmissions in the same or adjacent frequency bands. Interference can be especially problematic when the GPS receiver is co-located with a communications device that includes a radio transmitter, such as a cellular telephone. The transmitted signal from the co-located communication device can overload (or saturate) the GPS receiver front-end designed to receive weak GPS signals. In such a situation no useful information can be extracted from the received GPS signals originating from the GPS satellites. Described herein is a novel apparatus and method that can be used to minimize the effect of co-located interference on a GPS receiver.

17 Claims, 7 Drawing Sheets

U.S. PATENT DOCUMENTS

| | | | |
|---|---|---|---|
| 7,250,899 B2 * | 7/2007 | Smith et al. | 342/19 |
| 7,313,378 B2 * | 12/2007 | Terry | 455/254 |
| 2002/0012411 A1 | 1/2002 | Heinzl et al. | |
| 2003/0181178 A1 | 9/2003 | Zerod et al. | |

FOREIGN PATENT DOCUMENTS

| | | |
|---|---|---|
| JP | 11202040 | 7/1999 |

* cited by examiner

GPS RECEIVER WITH IMPROVED IMMUNITY TO BURST TRANSMISSIONS

FIELD OF THE INVENTION

The invention relates to spread-spectrum communications and, in particular, to an improved GPS receiver in close proximity to a radio frequency transmitter.

BACKGROUND OF THE INVENTION

The basic functionality of a Global Positioning System (GPS) receiver is to calculate the latitude, longitude and altitude of the GPS receiver's location (i.e., the co-ordinates of the receiver) upon receiving a number of GPS signals from a network of GPS satellites that orbit the earth. The calculation of the co-ordinates of the GPS receiver typically begins by comparing the timing associated with a select number of received GPS signals. After the initial comparison of the received GPS signals, values for timing corrections associated with the select group of received GPS signals are established. The timing corrections are made in order to solve a three-dimensional geometric problem, which has as its solution the co-ordinates of the GPS receiver.

The received GPS signals are typically weak and thus easily interfered with by other radio transmissions in the same or adjacent frequency bands. Interference can be especially problematic when the GPS receiver is co-located with a communications device that includes a radio transmitter, such as a cellular telephone. The transmitted signal from the co-located communication device can overload (or saturate) the GPS receiver front-end designed to receive weak GPS signals. In such a situation no useful information can be extracted from the received GPS signals originating from the GPS satellites.

In select instances this problem may be overcome by filtering all of the received signals from the GPS antenna before down conversion of the respective transmission signal band by the GPS receiver front-end. Typically a low noise amplifier (LNA) is first used to amplify the signal before further filtering or mixing to another frequency. The result of adopting this approach is that the loss of all signal energies in the filter reduces the sensitivity of the GPS receiver permanently, irrespective of whether or not the co-located communications device is transmitting. This is undesirable as the GPS signals received from the satellites are weak and reducing the sensitivity of the GPS receiver further reduces the operability of the system. Additionally, the filter would also occupy space, add cost to the unit and would draw additional power.

The problem caused by the co-located communications device may be alternatively overcome by the use of a high linearity LNA. This would ensure that the LNA is capable of amplifying the GPS signal despite the presence of a large interfering locally generated transmission. The disadvantage of this solution is that such an LNA would consume additional power, which is not acceptable in a portable battery powered device such as a cellular telephone. A filter following the LNA would also be required to provide sufficient rejection of the interfering signal to prevent overload of the next stage of the receiver, typically a mixer. These additional performance requirements increase the size, power consumption and cost of the filter and make implementing a highly integrated receiver design without the additional filter difficult.

SUMMARY OF THE INVENTION

The invention provides a radio receiver, and methods for use with the radio receiver, that utilize information from a co-located transmitter to provide an indication to the radio receiver of a transmission signal from the co-located transmitter that will potentially overload the radio receiver. The desired signal to be received by the radio receiver is smaller in amplitude than the transmission signal from the co-located transmitter and as such if the co-located transmitter is transmitting, the radio receiver will be overloaded. The indication from the co-located transmitter is used by an automatic gain control (AGC) component to control the gain of the AGC component in such a manner that the radio receiver is able to recover the desired signal more quickly after the received signal is no longer overloaded, than if the gain of the AGC component was not controlled in such a manner.

According to one aspect of the invention, there is provided a method of operating a radio receiver in which a signal identifying a received signal overload condition is provided to an automatic gain control component. A gain value of the automatic gain control component is controlled based on the signal identifying the received signal overload condition. When the signal identifying the received signal overload condition is detected a locally generated bit pattern is coupled into a back-end of the radio receiver. The locally generated bit pattern is selected such that when the received signal is processed less noise accumulates in the radio receiver back-end than if a bit-stream derived from the received radio signal were processed directly.

According to another aspect of the invention, there is provided a radio receiver for receiving radio signals, which includes an automatic gain control (AGC) component, a converter for deriving a bit-stream of digital data from a received radio signal, and a means for substituting the bit-stream of digital data with a locally generated bit pattern in response to the signal identifying the received signal overload condition. The AGC component controls a gain value of the AGC component based on a signal identifying a received signal overload condition. The locally generated bit pattern is selected such that when the received signal is processed less noise accumulates in the radio receiver back-end than if a bit-stream derived from the received radio signal were processed directly.

According to a further aspect of the invention, there is provided a method of limiting the effect of interfering transmission on a GPS receiver. The method includes controlling a gain value of an AGC component based on a signal identifying a received signal overload condition provided by a transmitter local to the GPS receiver.

Other aspects and features of the present invention will become apparent, to those ordinarily skilled in the art, upon review of the following description of the specific embodiments of the invention.

BRIEF DESCRIPTION OF THE DRAWINGS

Preferred embodiments of the invention will now be described in greater detail with reference to the accompanying diagrams, in which.

DETAILED DESCRIPTION OF THE INVENTION

Figure 1:
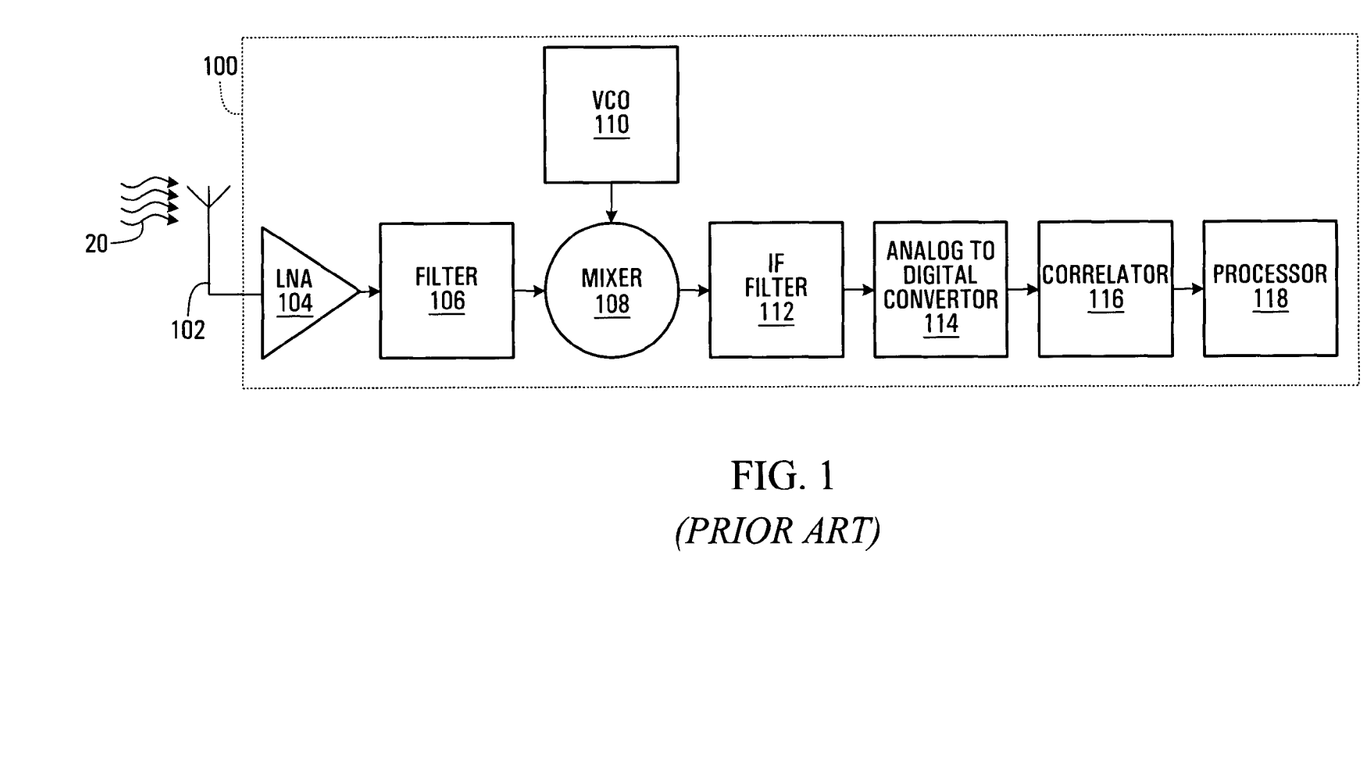
FIG. 1 is a block diagram illustrating a conventional Superheterodyne (superhet) GPS receiver.

The Superheterodyne (superhet) Architecture is a common receiver front-end architecture used for mobile communication applications. Shown in FIG. 1 is a simplified block diagram of a conventional GPS receiver 100 incorporating the superhet architecture. In FIG. 1 the superhet architecture comprises an antenna 102, a Low Noise Amplifier (LNA) 104, an optional image-rejection filter 106, a mixer 108, a Voltage Controlled Oscillator (VCO) 110 and an Intermediate Frequency (IF) filter 112.

A radio signal 20 at the radio frequency (RF) is first received by the antenna 102 and amplified by the LNA 104. The filter 106 then optionally filters the radio signal 20. The requirement for this filter can be removed by integrating its function into the LNA 104 or the mixer 108. The mixer 108 down-converts the radio signal 20 from the RF to the lower IF by using a local oscillator (LO) signal generated by the VCO 110. At this point the radio signal 20 is now centered on a low enough frequency where it is possible to perform the back-end processing.

The transition from front-end to back-end processing requires the radio signal 20 that has been down-converted to be filtered by the IF filter 112 and then passed to an analogue-to-digital converter (ADC) 114. The ADC 114 converts the radio signal 20 from a summation of analogue waveforms into a bit-stream of digital data that can be processed.

The back-end processing of received signals that is of concern to the present invention comprises a correlator 116 and a processor 118. GPS signals are modulated in a manner similar to CDMA transmissions, whereby pseudo-random codes are employed to identify each of the orbiting GPS satellites and aid in resolving the timing of the received GPS signals. As such the signals are processed digitally by logic which performs a correlation function in the correlator 116. In the correlator 116 the processing gain applied to the spread spectrum GPS signal raises the signal level above the noise being received when a local copy of the code specific to an individual GPS satellite is placed in-phase with the received signal modulated with the same code. This correlation and synchronization process must be carried out for all the GPS satellites in order to identify the strongest set of signals to be used to calculate the GPS receiver's co-ordinates. The results are then passed from the correlator 116 to the processor 118 to determine the signal path delays to each of the satellites and hence enable calculation of the location of the receiver.

When a large interference signal is present, such as from a co-located or nearby transmitter, the front-end radio circuits become overloaded and the GPS signal is corrupted, preventing the correlator 116 block from obtaining useful information. As the correlator 116 cannot determine that the GPS signal is corrupted it continues to process the received signal 20, continuing to accumulate noise, so that the ratio of useful signal to noise (SNR) is reduced.

When operating under normal signal conditions the correlated GPS signal accumulates linearly with duration, while the noise accumulates with the square root of the duration, so increasing the duration improves the desired signal-to-noise ratio (SNR). When the system is overloaded the GPS signal is corrupted and the desired signal accumulation ceases while the noise accumulation continues to increase, resulting in a degradation of the signal-to-noise ratio.

Figure 2:
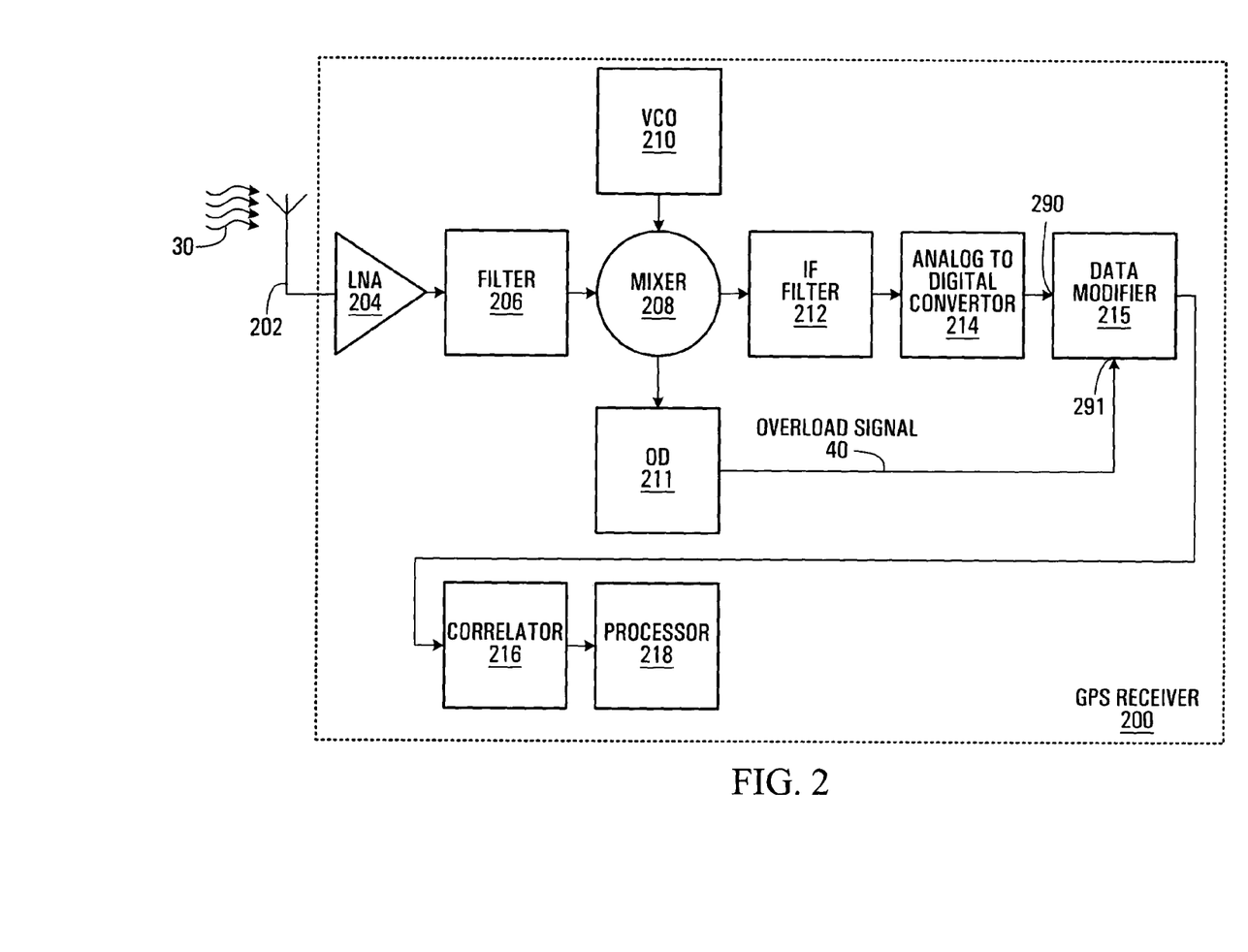
FIG. 2 is a block diagram of a superhet GPS receiver improved according to aspects of the invention.

FIG. 2 is a simplified block diagram showing how the conventional GPS receiver 100 can be modified to provide an improved GPS receiver 200 according to aspects of the invention. The GPS receiver 200 also uses the superhet front-end architecture that was employed in the GPS receiver 100 of FIG. 1. Therefore an antenna 202, LNA 204, an optional filter 206, a mixer 208, a VCO 210 and an IF filter 212 all have the same basic functionality as the corresponding circuits 102, 104, 106, 108, 110 and 112 respectfully of the GPS receiver 100, shown in FIG. 1. The back-end of the GPS receiver 200 of FIG. 2 also includes an ADC 214, correlator 216 and a processor 218 corresponding respectively to the ADC 114, the correlator 116 and the processor 118 shown in FIG. 1.

In addition to the aforementioned components, the GPS receiver 200 is improved by enabling the radio front-end to detect strong interfering signals and pass that information to the radio back-end. To this end a further circuit referred to as a overload detector 211 is connected to or is integrated into the mixer 208 and provides an electronic signal 40 hereinafter referred to as the overload signal. The overload signal 40 is then routed to the radio back-end. In the present embodiment of the invention, as shown in FIG. 2, a further circuit in the radio back-end referred to as a data modifier 215 accepts at a control input 291 the overload signal 40. The data modifier 215 is connected between the ADC 214 and the correlator 216, and receives at its data input 290 the output of the ADC 214.

More precisely, the overload signal 40 is derived from a point in the chain of circuits processing the radio signal (i.e. the radio front-end) which indicates that a large signal is present and the overload is at such a level that the GPS signal will be corrupted at the output of the ADC 214, preventing the system from obtaining useful information at this time from the correlator 216. This signal is shown as being derived from the mixer 208 in a overload detector 211 circuit but it could be derived from any of the front-end radio blocks where it is possible to distinguish the level of signal being received. For example, the overload signal 40 may be derived from the LNA 204 as a function of the linearity of operation of the LNA 204. Preferably, the overload detector 211 is integrated into the mixer 208 or any of the other front-end radio circuits. However, the overload detector 211 has been shown here as a separate block in order to discuss its function and highlight its presence in the radio front-end.

The data modifier 215 is meant to selectively substitute the output of the ADC 214 with a digital bit pattern constructed so as to prevent the correlator 216 from accumulating noise while the GPS signal is corrupted. The simplest sequence of bit values that accomplishes this is an alternating series of +1 and −1 values, though other patterns are possible. The values of +1 and −1 are often represented on the digital output as logic 1 and logic 0 respectively, though again other representations are possible which achieve the same purpose.

The replacement data stream has the desired property that when accumulated for a period of many data bits the average value substantially tends rapidly towards zero with a zero value standard deviation, while the random data stream normally present in the overload conditions tends towards zero but with a standard deviation proportional to the square root of the number of bits accumulated. This results in the noise accumulation in the correlator ceasing for the duration of the overload, so the desired signal-to-noise ratio does not decrease due to the overload condition.

Note that the digital data stream is often processed before being used by the correlator 216, for instance multiplying by the output of a numerically controlled digital oscillator to remove the intermediate frequency by down conversion to baseband. This type of processing does not change the statistical properties of the data stream regarding the accumulation of noise.

The overload signal 40 could be passed into a control input of the correlator block directly to provide another embodiment of the invention in which the correlator 216 directly accepts at a data input the output of the ADC 214. In such a case, there would be no need for an explicit data modifier 215 circuit, as the functionality of the data modifier 215 would be integrated into the correlator 216. However such an embodiment might not be practical as it is often the case that the radio circuits and the correlator circuits are built as separate integrated circuits making it difficult or impossible to couple an overload signal to the correlator.

Figure 3:
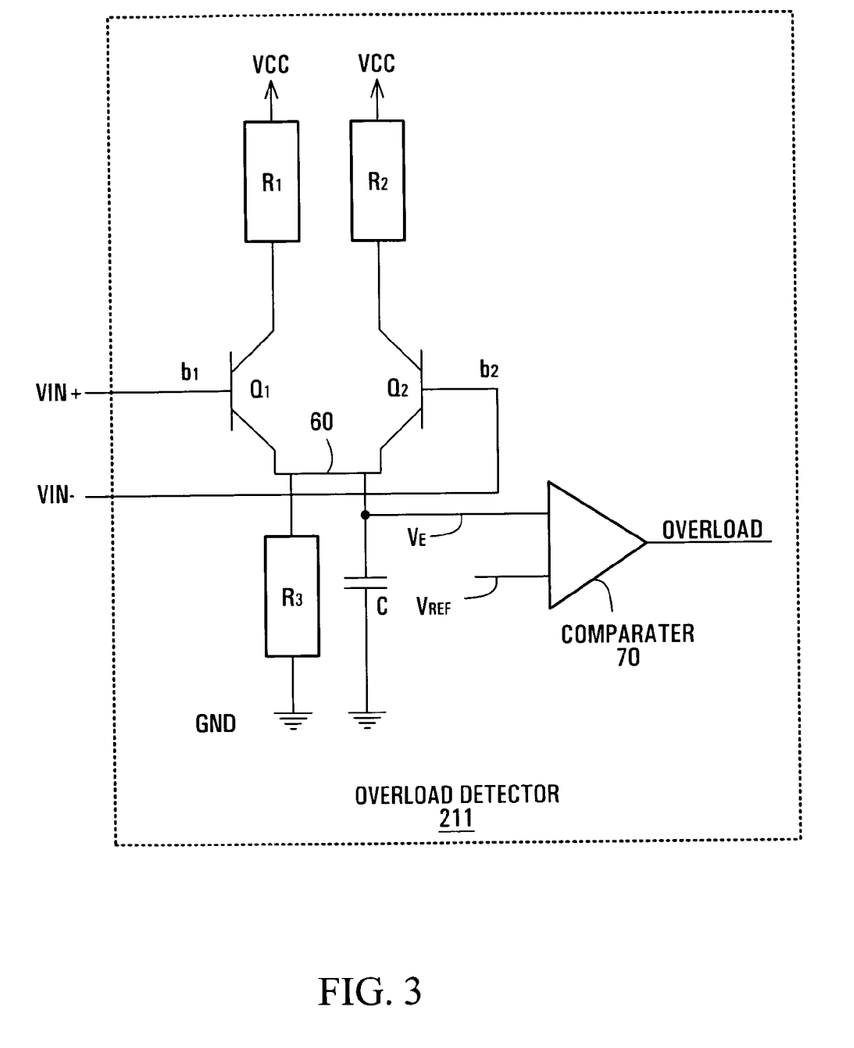
FIG. 3 is a schematic representation of a typical circuit for sensing a signal level.

FIG. 3 shows a typical embodiment of the overload detector 211. Assuming a differential signal path from the mixer 208, the level of the radio signal 30 is peak-detected by the action of a differential pair of bipolar junction transistors (BJTs) Q1 and Q2, each BJT having a base terminal, b1 and b2 respectively. The base terminals b1 and b2 serve as the differential inputs to the overload detector 211 receiving a differential signal Vin from the mixer 208. The overload detector further comprises a resistor R3 and capacitor C connected in parallel between a common emitter node 60 and a ground (GND) voltage rail. Furthermore, the collector of each BJT Q1 and Q2 is connected to a power supply rail Vcc via resistors R1 and R2, respectively. Lastly, the emitter node 60 is connected to a comparator 70, the comparator also having a second input connected to a voltage reference VREF and an output from which the overload signal 40 of FIG. 2 can be tapped.

The overload detector 211 is actually a basic embodiment of an 'envelope detector' circuit. Such a circuit works by use of large signal swing non-linear operation, so small signal analysis typically employed in analogue circuit design does not explain its operation accurately. The circuit topology can be built up as follows. The basic operation of the overload detector 211 is to follow the envelope of an amplitude-modulated signal Vin, removing the carrier and giving an output—the overload signal 40—proportional to the amplitude of the radio signal 30.

The simplest envelope detector (not shown) is a series diode feeding a capacitor in parallel with a resistor R. The capacitor charges via the diode on the signal peaks, and discharges (slowly with respect to the carrier period, rapidly with respect to the modulation period) via the resistor. This simple circuit has a very low input non-linear impedance (essentially zero on the charging peaks, infinite at other times) so the diode is replaced with a transistor. As the input rises the transistor turns on and charges the capacitor from the supply line, as it then drops the transistor turns off, leaving the capacitor with the peak voltage (minus a VBE drop, a permanent offset). The input impedance is thus higher, though still non-linear.

The transistor version still only works on one polarity peak, so by having a differential input both positive and negative signal peaks can both be used, which has the benefit of doubling the carrier ripple frequency, making the choice of RC time constant slightly easier. The resistance value R has to be chosen considering DC bias conditions as well as the RC time constant.

A practical circuit is more complex, as DC variations due to process variation, temperature and supply voltage all need compensating, as well as circuits to bias the circuit to work with signal levels small compared, to a base-emitter voltage (VBE) drop.

During normal operation, i.e., small signal operation of the radio front-end the overload detector 211 receives the differential input Vin from the mixer 208. The voltage VE at the emitter node 60 remains at a nominal voltage ensuring that both BJTs Q1 and Q2 are operating in their active mode, i.e., they are turned on. When the nominal voltage is compared to the reference voltage VREF the derived overload signal 40 represents a nominal condition where the radio front-end is not being overloaded.

However, during large signal operation, i.e., overload operation the differential input Vin received from the mixer 208 causes the BJTs Q1 and Q2 to switch on and off depending on the phase of the signal at any given instant. The large input signal swing causes the instantaneous base voltage at any given instance to be very large and in turn forces the common emitter node 60 voltage VE to rise such that the base-emitter voltage remains approximately equal to the 0.7 Volt threshold voltage intrinsic to the base-emitter PN junction of the BJT. Once VE rises significantly in relation to VREF the comparator switches the overload signal 40 to indicate that the radio front-end is being overloaded by a strong transmission within the same transmission band or within an adjacent signal band.

Figure 4:
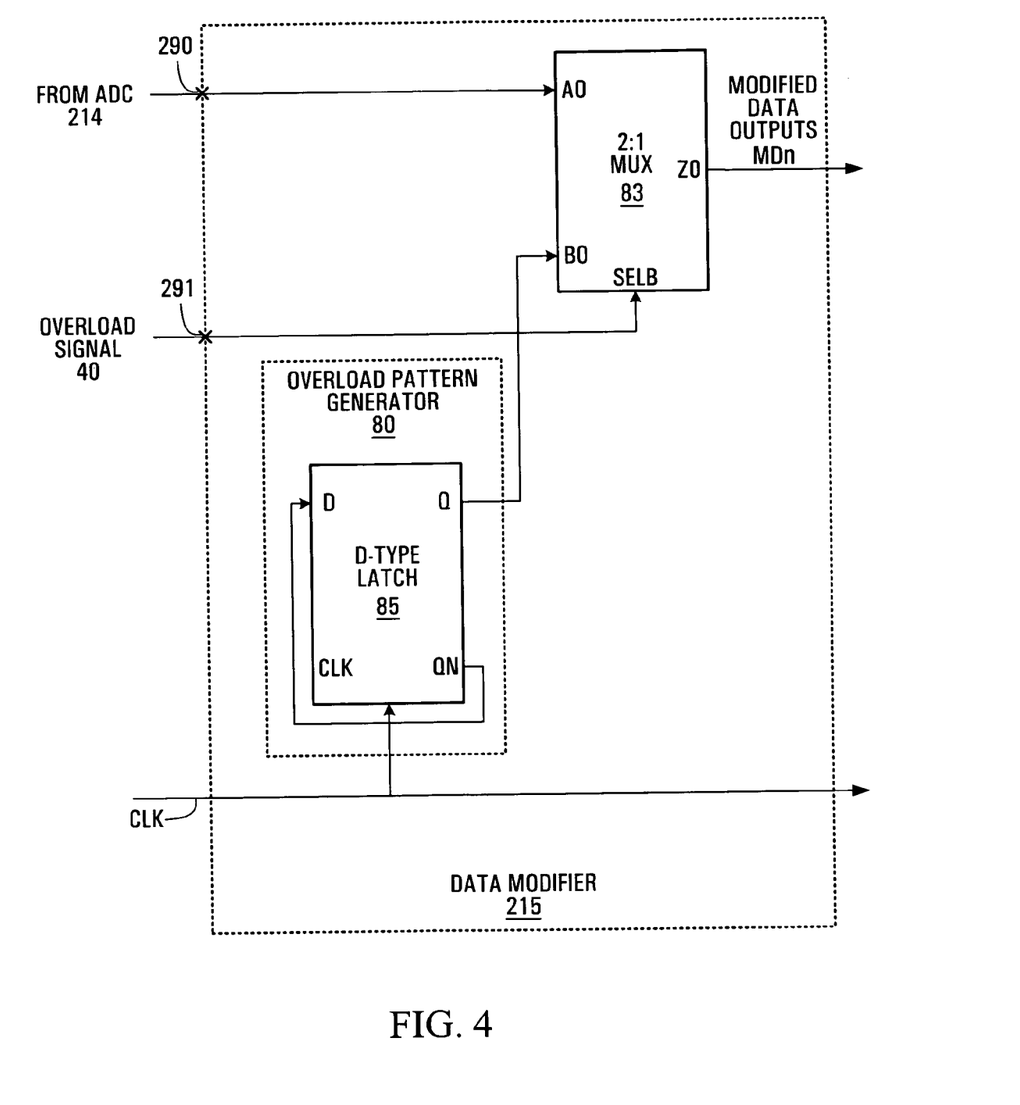
FIG. 4 is a schematic representation of an embodiment of a data modifier circuit according to aspects of the invention.

FIG. 4 shows a specific embodiment of the data modifier 215. The control input 291 of the data modifier is connected to receive the overload signal from the radio front-end. In this embodiment the overload signal 40 is the control signal for a 2:1 Multiplexer (MUX) 83 and is connected at the SELB input of the 2:1 Multiplexer (MUX) 83. The overload signal 40 can be active high or active low depending upon the design choices made by one skilled in the art without unnecessary experimentation. The MUX 83 has two other inputs A0 and B0, one of which at any given instant is selectively coupled to the MUX 83 output Z0. The input A0 is connected to the data input 290 of the data modifier, which is externally connected to receive the output of the ADC 214. The MUX 83 output Z0 is also connected to the output of the data modifier 215. As shown in FIG. 4 the digital output (bit stream) from the ADC 214 is connected to input A0. The digital output of the ADC 215 is coupled to the output of the data modifier 215 via the MUX 83 when the radio front-end is not experiencing overload conditions. However when the radio front-end is experiencing overload conditions the overload signal 40 will be driven active to indicate this fact and the MUX 83 will couple B0 to its output Z0. Connected to B0 is an overload pattern generator 80. In this embodiment the overload pattern generator 80 delivers an alternating series of logic 1's and 0's. This pattern is generated by coupling the inverting output QN of a D-type latch 85 to its input terminal D and using the non-inverting output Q as the source of the overload pattern to be connected to the MUX 83 input B0. Furthermore, the pattern alternates according to a digital clock signal CLK that provides the timing for digital circuits in the radio back-end.

The overload detector 211 described above is only one embodiment of a signal detection means that is usable according to aspects of the invention. Other well known signal detection means could also be used.

Similarly, although down converting the received radio signal from the RF to the IF was a feature used in the embodiment disclosed, the modifications to the GPS receiver according to aspects of the invention could be employed in a radio receiver that did not have down conversion as a feature. In other words the digital signal processing may take place at the RF; however, this would not affect the operability of the invention disclosed when applied to such a radio receiver.

The proposed improvement has the additional benefit that it can be fitted to systems based on existing correlators and processor devices without requiring their modification in order to gain the system advantage shown.

We can determine the benefits to be gained from the present invention as follows. Assume for simplicity the transmission sequence as used by the Global System for Mobile (GSM) cellular standard, though any time division duplex or time division multiple access system could be substituted by changing the various parameters discussed.

A co-located transmitter is turned on for a burst period corresponding to one or more slots in a frame of a preset number of slots, 8 in the case of GSM. The GSM enhancement known as GPRS allows the transmitter to be switched on for 2 or 4 slots rather than the 1 slot used normally for voice. The co-located transmitter is therefore on for a proportion of the time varying from ⅛ to ½ depending on the mode of operation. Defining the proportion of time the transmitter is on to be f, where f varies from 0 to 1.0, typically being 0.125 to 0.5 in the GSM/GPRS situations previously discussed.

For GPS receivers without the improvements provided by aspects according to the invention, the GPS system performance is changed by 20 log(1−f) dB. Alternatively, for GPS receivers able to benefit from the improvements provided by aspects of the invention the GPS system performance changes by only 10 log(1−f) dB. These values are tabulated below for example values of f.

| | System change of performance (dB) | |
|---|---|---|
| F | Normal System | Improved System |
| 0 | 0.0 | 0.0 |
| 0.125 | −1.2 | −0.6 |
| 0.25 | −2.5 | −1.2 |
| 0.375 | −4.1 | −2.0 |
| 0.5 | −6.0 | −3.0 |
| 0.625 | −8.5 | −4.3 |
| 0.875 | −18.1 | −9.0 |

This demonstrates that even a single slot system will benefit by 0.6 dB, and as GPRS systems become more common a benefit of 3 dB will often occur.

The overload signal 40 can also be used as an input to other circuit blocks in the receiver, such as automatic gain control circuits, in order to assist the circuit to recover rapidly from the overload condition.

Figure 5:
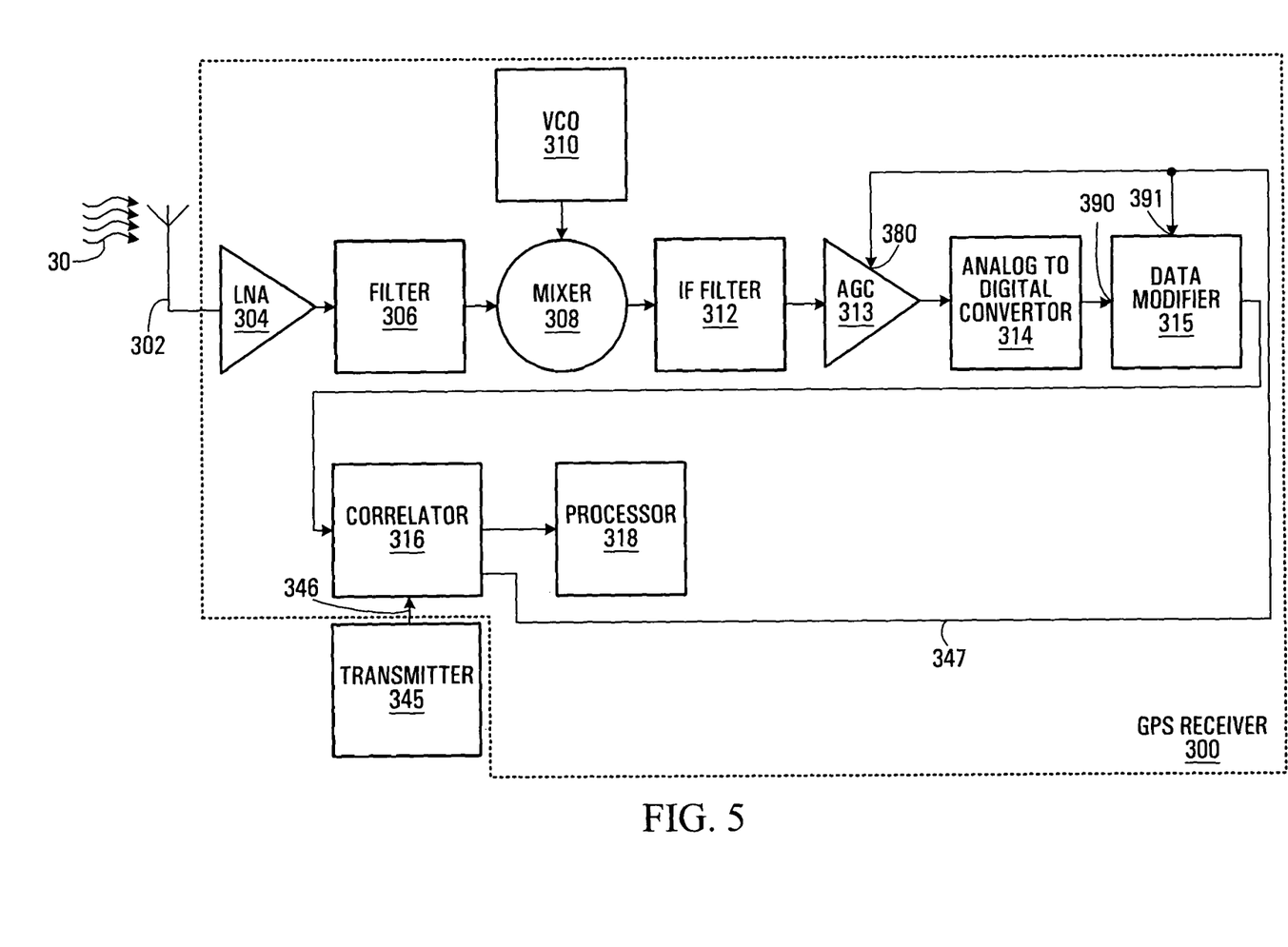
FIG. 5 is a schematic representation of a superhet GPS receiver according to another embodiment of the invention.

FIG. 5 shows a block diagram of another embodiment of the conventional GPS receiver 200. GPS receiver 300 has a superhet front-end architecture which is similar to that shown in FIG. 2. GPS receiver 300 includes an antenna 302, LNA 304, a filter 306, a mixer 308, a VCO 310 and an IF filter 312. These components all have the same basic functionality as the corresponding components in FIG. 1. The front-end architecture also includes an automatic gain control (AGC) component 313 that is coupled to an output of the IF filter 312.

A back-end of GPS receiver 300 includes an ADC 314 that is coupled to the AGC component 313, a data modifier 315 having a data input 390 for receiving an output from the ADC 314, a correlator 316 and a processor 318. The ADC 314, correlator 316 and processor 318 have similar functionality to corresponding components in FIG. 2. In FIG. 5, the correlator 316 is also coupled via signal path 347 to both the data modifier 315 at control input 391 and the AGC component 313 at control input 380.

Also shown in FIG. 5 is a transmitter 345. The transmitter 345 is coupled to the GPS receiver 300 by signal path 346. In particular, the transmitter 345 is coupled to the correlator 316 via an output enable signal line that provides the correlator 316 an indication that an interfering signal burst is about to occur in the form of a signal transmitted by the transmitter that is capable of overloading signal line is coupled to AGC component 313 or data modifier 315. Transmitter 345 is an example of the transmitter described above that is in close proximity to the GPS receiver 300 and generates a transmitter signal that potentially overloads the GPS receiver 300.

In operation, the AGC component 313 controls the gain of an intermediate frequency signal output from the IF filter 312 (or the mixer 308 if no IF filter is used) that is input to the ADC 314. If the intermediate frequency signal is weak in intensity the AGC component 313 increases the gain applied to the intermediate frequency signal and if the signal is strong the AGC component 313 reduces or maintains the gain to the intermediate frequency signal. In this manner the intermediate frequency signal output by the AGC component 313 and received by the ADC 314 is of a substantially constant amplitude level. Techniques for implementing automatic gain control functionality in the AGC component 313 may include techniques known to those skilled in the art pertaining to automatic gain control.

In the embodiment of FIG. 5, the AGC component 313 receives the output enable signal from the transmitter 345. The output enable signal provides the GPS receiver 300 with a capability for reducing the time wherein the received signal 30 is corrupted, thereby aiding the GPS receiver 300 in maintaining an acceptable signal to noise level. The output enable signal can be coupled directly or indirectly to the AGC component 313 as a controlling signal to aid in controlling the gain of the AGC component 313.

An example of indirect coupling is the example of FIG. 5 in which the output enable signal is communicated from the transmitter 345 to correlator 316 using a first output enable signal in signal path 346 and then further transmitted as a second output enable signal to the AGC component 313 on signal path 347. The correlator 316 may or may not perform additional processing on the first output enable signal from the transmitter 345. In some embodiments of the invention the first output enable signal is routed through the correlator 316 due to architecture design details of the radio receiver. In direct coupling, the output enable signal from the transmitter 345 is coupled directly to the AGC component 313 and/or the data modifier 315, for example signal path 347 is connected directly to transmitter 345 instead of first connecting through correlator 316 via signal path 346.

As described above, in FIG. 5, the first output enable signal is communicated on signal path 346 from the transmitter 345 to the correlator 316. The first output enable signal may be for example, a type similar to that used to enable a power amplifier in the transmitter 345. For example, the first output enable signal is set high when the transmitter 345 is transmitting and is set low when the transmitter 345 is not transmitting. An example of the first output enable signal is a transmission enable (TXEN) signal in a GSM communications transmitter.

A second output enable signal is communicated on signal path 347 from the correlator 316 to the control input 380 of AGC component 313. The second output enable signal is a function of the first output enable signal received by the correlator 316 from the transmitter 345. The second output enable signal provides an indication of when the transmitter 345 is transmitting. The indication of when the transmitter 345 is transmitting provides the AGC component 313 an opportunity of knowing when the GPS receiver 300 may be overloaded by the transmitted signal from the transmitter 345. Using this indication, the AGC component 313 captures the present gain value of the AGC component 313 or a gain value at a particular interval before the second output enable signal is received to ensure that a gain value prior to start of an overload is captured. In this embodiment, the AGC component 313 maintains the gain value for the duration of the overload. In another embodiment of the invention, the second output enable signal may initiate the AGC component 313 capturing the present gain value of the AGC component 313 or using a gain value at a particular interval before the second output enable signal is received, storing the gain value during the overload, and resetting the gain value to that of the stored gain value after the overload has ended.

The second output enable signal is also coupled to the control input 391 of the data modifier 315. The second output enable signal is used to provide an indication of when the data modifier 315 should substitute the output of the ADC 314 with a digital bit pattern constructed to prevent the correlator 316 from accumulating noise while the received signal 30 is corrupted based on the indication from the transmitter 345 of when the transmitter 345 is transmitting. The data modifier 315 is adapted to use the second output enable signal in a similar way to that of the overload signal 40 as described above with regard to FIG. 2. The data modifier 315 may be similar to the data modifier 215 in FIG. 4, except that the overload signal input to control input 291 is the second output enable signal input to control input 391, as shown in FIG. 5.

In some embodiments of the invention, the second output enable signal is not coupled to the data modifier 315, but only to the AGC component 313.

Without an indication of when an overload is likely to occur there is no significant opportunity to capture the gain level of the AGC component 313 before the AGC component is overloaded. The gain level output from the AGC component 315 would vary substantially between when the received signal 30 at antenna 303 is overloaded and when it is not overloaded. For example, if the GPS receiver 300 is overloaded by a larger signal transmitted by the transmitter 345, the gain level of the AGC component 313 is significantly reduced to compensate for the larger input signal so as to maintain a substantially constant amplitude level output from the AGC component that is supplied to the ADC 314. When the transmitter is finished transmitting and the GPS receiver 300 is no longer overloaded, the AGC component 313 then has to adjust the gain level to achieve a desired substantially constant amplitude level output from the AGC component 313.

The AGC component 313 maintaining the substantially constant amplitude level typically has a time constant of a predetermined duration. In other words, it can take upwards of the full duration of the time constant to adjust the gain to achieve a desired substantially constant amplitude level output from the AGC component 313. The time constant in some embodiments of the invention is approximately 10 msec.

While the time constant in some embodiments may be 10 msec as described above, more generally the time constant is a design parameter that is implementation specific. A fast feedback loop for the AGC component 313 makes it more sensitive to changing GPS signal strength. For example, in a moving vehicle the AGC loop is generally desired to settle to the correct gain in about 1-2 msec. On the other hand, a very fast loop (<<1 msec) will tend to be unstable and generate ripples in the gain as a function of time as it settles rather than a monotonic rise or fall to the correct gain value.

In a situation where the adjacent transmitter 345 overloads the GPS receiver 300 more frequently than the duration of the time constant of the AGC component 313, the AGC component 313 does not have sufficient time to adjust the gain that results in the desired substantially constant amplitude level before the next overload occurs. In this situation may take a long duration of time for the AGC component 313 to lock to the proper gain value and output the desired substantially constant amplitude level. This is undesirable for the previously described reason that when the system is overloaded, the GPS signal is corrupted and the desired signal accumulation ceases while the noise accumulation continues to increase. If the AGC component 313 cannot provide an appropriate gain to generate a signal with the desired substantially constant amplitude level to the ADC 314, then the received signal 30 cannot be properly correlated by the receiver back-end.

Figure 7A:
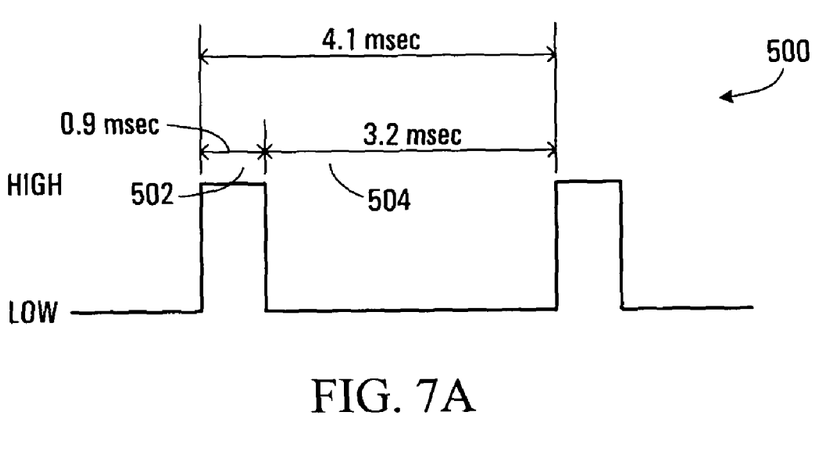
FIG. 7A is an example of a timing signal for a Global System for Mobile (GSM) communications signal.
Figure 7B:
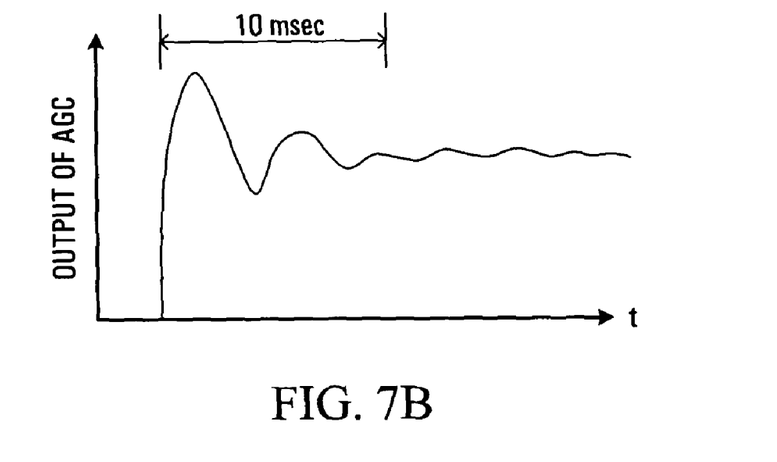
FIG. 7B is an example plot of an automatic gain control component output signal responding to an applied input.

An example output signal from the AGC component 313 is shown in FIG. 7B. In the case of FIG. 7B, an input signal is applied to the AGC component 313 and the time duration for the output to reach the substantially constant amplitude level output from an initial zero output is shown to be approximately 10 msec. In a situation where a new signal is applied to the AGC component 313 or where a signal that is significantly different in amplitude than a signal being currently received is suddenly detected by the AGC component 313, the AGC component 313 may need substantially the full duration of the time constant to adjust to the proper gain and supply the desired substantially constant amplitude level. In a situation where an input signal is applied to the AGC component 313 and the AGC component 313 is set at a value of gain that yields an output that is similar to a desired substantially constant amplitude level, the AGC component 313 takes less time than the full duration of the time constant to reach the desired substantially constant amplitude level.

Typically, the amplitude level of a received GPS signal 30 will not vary significantly over a period of time on the order of the time constant of the AGC component 313. Maintaining or resetting the gain level of the AGC component 313 to the gain level that existed before an overload was identified provides that the desired substantially constant amplitude output is recaptured very soon after the overload condition ends. This is because neither the input to the AGC component 313 nor the gain value will have varied significantly during the duration of the overload condition. Therefore, capturing or maintaining a value of the gain at a value that is known just prior to when an overload is known to have occurred and ensuring that the gain value is maintained or reset to the captured value after the overload has ended, enables the AGC component 313 to lock onto the appropriate value of the gain that provides the desired substantially constant amplitude output in a reduced amount of time, in particular before the next overload occurs. This is especially true if the period of the overload is known and/or is periodic and/or the period is on the order of the time constant of the AGC component 313.

In some embodiments of the invention, the ACG component 313 maintains the pre-overload gain value during the overload. In some embodiments of the invention, the ACG component stores the gain value from just prior to the overload condition being identified, allows the gain value to vary during the overload, and then resets the gain value to the stored value after the overload has ended.

In some embodiments of the invention, the AGC component 313 includes circuitry for buffering the value of the gain so that when the overload condition is identified, the gain value just prior to the overload condition being identified is maintained. In some embodiments of the invention, the AGC component 313 includes circuitry for maintaining or storing the gain value during the overload. In some embodiments of the invention, the AGC component 313 includes circuitry for resetting the gain value with a buffered or stored gain value after the overload condition is known to have ended.

Figure 6:
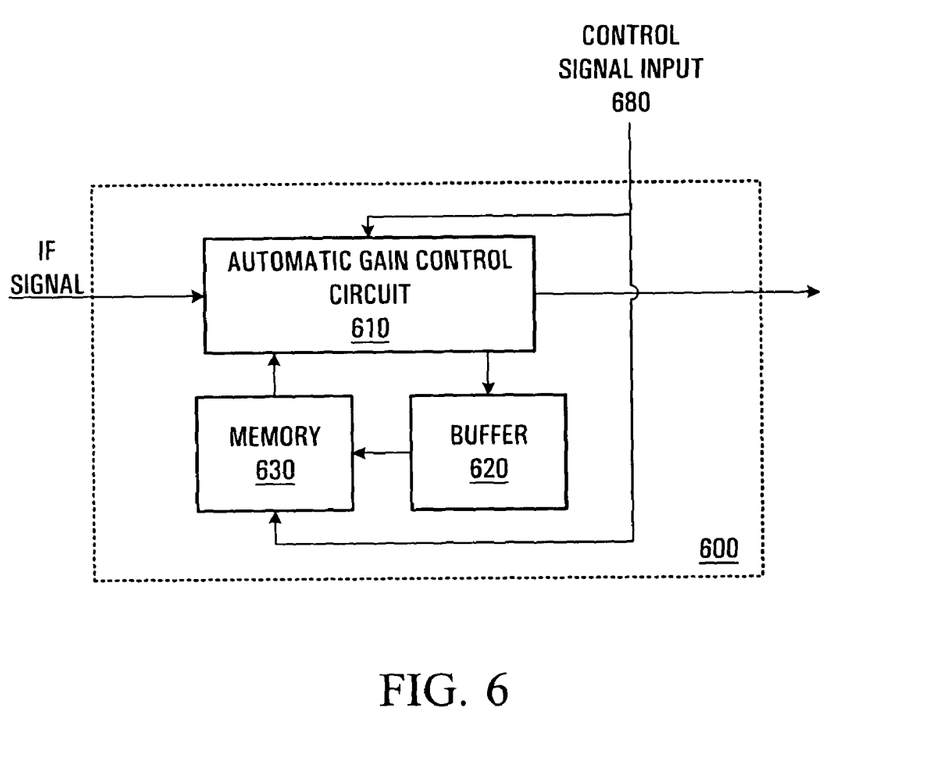
FIG. 6 is a schematic representation of an embodiment of an automatic gain control component according to embodiments of the invention.

A general embodiment of an AGC component 313 of the type described with regard GPS receiver 300 will now be described with respect to FIG. 6. The AGC component 600 includes an automatic gain control circuit 610, a buffer 620 and memory storage 630. The AGC component 600 receives a first input signal in the form of a received intermediate frequency (IF) signal that has been down converted by the front end of the radio receiver. The first input signal is provided to a first input of the automatic gain control circuit 610. A second input signal to the AGC component 600 is supplied to a control signal input 680. The control signal input 680 is coupled to a second input of the automatic gain control circuit 610. The control signal input 680 is also coupled to the memory storage 620. A first output of the automatic gain control circuit 610 is coupled to the buffer 620. The buffer 620 is coupled to the memory storage 630. The memory storage 630 is coupled to a third input of the automatic gain control circuit 610. A second output of the automatic gain control circuit 610 is an output of the ACG component 600.

The automatic gain control circuit 610 aids in the action of automatically controlling the gain level of the received intermediate frequency signal so that the automatic gain control circuit 610 outputs a substantially constant amplitude output. The buffer 620 continuously buffers a given duration of the gain level setting of the automatic gain control circuit 610. The second input signal is a control input signal, such as the control signal from an adjacent transmitter, supplied directly or indirectly as described above.

In some embodiments of the invention, the second input signal triggers disabling of the automatic gain control circuit 610, so that the automatic gain control circuit 610 maintains the gain level at a value prior to the occurrence of an overload. In some embodiments of the invention, the automatic gain control circuit 610 is disabled when the second input signal is received at the control signal input 680. The second input signal provides an indication that the transmitter is transmitting resulting in an overload condition for the receiver, which triggers the memory storage 630 to read into memory a value from the buffer 620. The value read into memory is a gain level setting from a point in time before the overload was detected. When the second input signal provides an indication that the transmitter is no longer transmitting, the memory storage 630 is triggered to provide the stored gained level to the automatic gain control circuit 610.

The AGC component 600 as described above is one example of how such a component could be implemented. The AGC component 313 is described as being a single component with the automatic gain control circuit 610, memory 630 and buffer 620 internal of the component. In some embodiments of the invention, the AGC component 313 is implemented as discrete components/circuitry for each of the automatic gain control circuit 610, memory 630 and buffer 620. It is to be understood that other implementations of disabling the automatic gain control circuit 610 and/or maintaining a gain value prior to the overload or storing a gain value known prior to the overload or resetting the automatic gain control circuit 610 known to those skilled in the art are to be considered within the scope of the invention.

The GSM communications technology mentioned above has progressed to the point where it is being used in almost all countries including the United States and Japan. An advantage of GSM technology is that it facilitates easy roaming. The United States have networks based on GSM, but instead of 900 MHz, which is the frequency band used in some other countries for GSM, GSM networks in the United States operate at 1800 MHz and 1900 MHz.

GSM phones operate in a transmission power range of approximately 25 to 35 dB. Received GPS signals are in a range of approximately −130 dBm. Based on these power levels it is obvious that a GPS receiver incorporated into a GSM phone would be overloaded by the GSM transmitter.

GSM signals have a periodic nature. FIG. 7A shows a representation of a timing signal 500 for a GSM signal. A single period of transmit and receive for the GSM signal is approximately 4.1 msec. The transmit portion 502 of the single period is approximately 0.9 msec. For the remainder of the period 504, the transmitter is off. The AGC component 313 shown in FIG. 5 has a time constant of a longer duration than the single period of the GSM signal. In some embodiments of the invention, the period of the GSM signal and the duration of the transmit and receive portions of the GSM signal may be somewhat more or less than values identified above.

What has been described is merely illustrative of the application of the principles of the invention. Other arrangements and methods can be implemented by those skilled in the art without departing from the spirit and scope of the present invention.

The invention claimed is:

1. A method of operating a radio receiver, the method comprising:
coupling a signal identifying a received signal overload condition into an automatic gain control (AGC) component;
controlling a gain value of the AGC component based on the signal identifying the received signal overload condition;
when a signal overload condition is identified:
capturing a given value of the gain value that occurred at a point in time prior to the received signal overload condition being identified;
during the signal overload condition:
instead of using the AGC component to control the gain applied to a received radio signal, coupling a locally generated bit pattern into a radio receiver back-end in response to a presence of the signal identifying the received signal overload condition, the locally generated bit pattern selected such that when processed causes less noise to accumulate in the radio receiver back-end than if a bit-stream derived from the received radio signal were processed using the gain of the AGC component;
after the received signal overload condition is identified to have ended:
setting the gain value of the AGC component to the given value and processing the received radio signal using the gain of the AGC component.

2. The method of claim 1, wherein the step of controlling a gain value further comprises:
disabling the operation of the automatic gain control component; and
maintaining the gain value at a level equal to that which occurred prior to the received signal overload condition being identified until after the received signal overload condition is identified to have ended.

3. The method of claim 1, wherein coupling a signal identifying the received signal overload condition into the AGC component comprises coupling a transmission indication signal from a transmitter co-located with the radio receiver into the AGC component.

4. The method of claim 1, wherein the locally generated bit pattern is an alternating sequence of high and low binary values.

5. The method of claim 1, wherein the locally generated bit pattern is a pseudo random sequence.

6. The method of claim 1, wherein the locally generated bit pattern has the property of an average value tending rapidly towards zero with a substantially zero value standard deviation.

7. A radio receiver for receiving radio signals, the radio receiver comprising:
an automatic gain control (AGC) component adapted to control a gain value of the automatic gain control component based on a signal identifying a received signal overload condition;
a converter for deriving a bit-stream of digital data from a received radio signal; and
a data modifier for substituting the bit-stream of digital data with a locally generated bit pattern in response to a signal identifying the received signal overload condition, the locally generated bit pattern being selected such that when processed it causes less noise to accumulate in the radio receiver back-end than if the bit-stream of digital data were processed using the gain of the AGC component;
wherein when a signal overload condition is identified the AGC is configured to:
capture a given value of the gain value that occurred at a point in time prior to the received signal overload condition being identified;
wherein during the signal overload condition:
instead of using the AGC component to control the gain applied to a received radio signal, the data modifier couples the locally generated bit pattern into the radio receiver back-end;
wherein after the received signal overload condition is identified to have ended the AGC is configured to:
set the gain value of the AGC component to the given value and process the received radio signal using the gain of the AGC component.

8. The radio receiver of claim 7, wherein the signal identifying the received signal overload condition is a transmission indication signal from a transmitter co-located with a front-end of the radio receiver.

9. The radio receiver of claim 7, wherein the radio receiver is a GPS (Global Positioning System) receiver.

10. The radio receiver of claim 7, wherein the radio receiver is further adapted to down-convert the received radio signal from a Radio Frequency (RF) to an Intermediate Frequency (IF), wherein the received radio signal is combined with a locally generated RF signal within a mixer to produce a down-converted copy of the received radio signal.

11. The radio receiver of claim 7 further adapted to receive a transmission indication signal from a transmitter co-located with the radio receiver and to relay the transmission indication signal to the automatic gain control component.

12. The radio receiver of claim 7 wherein the data modifier comprises a data input connected to receive the output of the converter and a control input to receive the signal identifying the received signal overload condition, the data modifier generating and substituting the locally generated bit pattern for the bit-stream of digital data that is input to a correlator when the signal identifying the received signal overload condition indicates an overload condition.

13. The radio receiver of claim 7, wherein the radio receiver is a GPS receiver.

14. The radio receiver of claim 7, wherein the signal identifying the received signal overload condition is from a GSM (Global System for Mobile) phone transmitter.

15. The radio receiver of claim 7, further comprising:
an antenna for receiving an radio frequency (RF) signal;
a low noise amplifier coupled to the antenna;
a filter coupled to the low noise amplifier;
a mixer including a voltage controlled oscillator for down converting the RF signal coupled to the filter;
an intermediate frequency (IF) filter for filtering the down converted IF signal coupled to the mixer and coupled to the AGC component;
wherein the converter is an analogue-to-digital converter coupled to the AGC component and the means for substituting the bit-stream is a data modifier coupled to the analogue-to-digital converter;
wherein the radio receiver is adapted to perform down-conversion of at least one radio signal received at a radio RF to an IF, to derive a bit stream of digital data from at least one radio signal after it has been down converted to the IF, and to process the bit stream of data.

16. A method of limiting the effect of interfering transmission on a GPS receiver, the method comprising:
controlling a gain value of an AGC component based on a signal identifying a received signal overload condition provided by a transmitter local to the GPS receiver;
wherein the step of controlling a gain value comprises:
when a signal overload condition is identified:
capturing a given value of the gain value that occurred at a point in time prior to the received signal overload condition being identified;
during the signal overload condition:
instead of using the AGC component to control the gain applied to a received radio signal, coupling a locally generated bit pattern into a radio receiver back-end in response to a presence of the signal identifying the received signal overload condition, the locally generated bit pattern selected such that when processed causes less noise to accumulate in the radio receiver back-end than if a bit-stream derived from the received radio signal were processed using the gain of the AGC component;
after the received signal overload condition is identified to have ended:
setting the gain value of the AGC component to the given value and processing the received radio signal using the gain of the AGC component.

17. The method of claim 16, wherein the signal identifying the received signal overload condition is from a GSM phone transmitter.

* * * * *